US009506603B2

(12) United States Patent
Li et al.

(10) Patent No.: US 9,506,603 B2
(45) Date of Patent: Nov. 29, 2016

(54) METAL HYDRIDES WITH EMBEDDED METAL STRUCTURES FOR HYDROGEN STORAGE

(75) Inventors: Wen Li, El Segundo, CA (US); John J. Vajo, West Hills, CA (US); Alan J. Jacobsen, Woodland Hills, CA (US); Mei Cai, Bloomfield Hills, MI (US); Martin P. Sulic, Center Line, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 784 days.

(21) Appl. No.: 13/615,988

(22) Filed: Sep. 14, 2012

(65) Prior Publication Data

US 2014/0076743 A1 Mar. 20, 2014

(51) Int. Cl.
*F17C 11/00* (2006.01)

(52) U.S. Cl.
CPC ............ *F17C 11/005* (2013.01); *Y02E 60/321* (2013.01); *Y10T 29/49826* (2015.01)

(58) Field of Classification Search
CPC ............... F17C 11/005; Y02E 60/321; Y10T 29/49826; B01D 53/04
USPC .................. 96/108, 154; 206/0.7; 423/658.2; 420/900; 429/512, 515
See application file for complete search history.

(56) References Cited

U.S. PATENT DOCUMENTS 4,187,092 A * 2/1980 Woolley .......................... 62/46.2
4,292,265 A 9/1981 Ron et al.
4,310,601 A * 1/1982 Bernauer et al. ............. 428/566
4,457,136 A * 7/1984 Nishizaki et al. ............. 62/46.2
6,015,041 A * 1/2000 Heung ............................ 206/70
6,709,497 B2 * 3/2004 Myasnikov et al. ............ 96/126
7,651,554 B2 * 1/2010 Tan et al. ........................ 96/108
9,126,834 B2 * 9/2015 Li .......................... B82Y 30/00
2006/0205830 A1 * 9/2006 Lebowitz et al. ............ 521/125
2006/0237688 A1 * 10/2006 Zimmermann ............... 252/184
2011/0111954 A1 * 5/2011 Li et al. ........................ 502/406

FOREIGN PATENT DOCUMENTS

JP 56-114802 A * 9/1981

OTHER PUBLICATIONS

Internet Document "wetting agent" from www.thefreedictionary.com/wetting+agent, 2016.*

* cited by examiner

*Primary Examiner* — Frank Lawrence
(74) *Attorney, Agent, or Firm* — BrooksGroup

(57) ABSTRACT

One illustrative embodiment includes materials and devices including an integrated hydrogen storage structure including a plurality of continuously connected thermally conductive elongated members, the elongated members including continuously connected openings between the elongated members; and, a metal hydride material contacting the elongated members and disposed within the connected openings and surrounding the elongated members.

20 Claims, 4 Drawing Sheets

12A
14
12B
12

METAL HYDRIDES WITH EMBEDDED METAL STRUCTURES FOR HYDROGEN STORAGE

TECHNICAL FIELD

The field to which the disclosure generally relates includes metal hydride materials and devices used for hydrogen storage.

BACKGROUND

Metal hydride materials are attractive for use in hydrogen storage system. The thermal conductivity of metal hydride materials may affect the rate of charging and discharging a hydrogen storage system.

SUMMARY OF ILLUSTRATIVE EMBODIMENTS OF THE INVENTION

One exemplary embodiment includes an integrated hydrogen storage structure including a plurality of continuously connected thermally conductive elongated members, the elongated members including continuously connected openings between the elongated members; and, a metal hydride material contacting the elongated members and disposed within the connected openings and surrounding the elongated members.

Another exemplary embodiment includes an integrated metal hydride hydrogen storage bed including a metal containing structure comprising plurality of continuously connected elongated metal containing members, the elongated metal containing members including continuously connected spaces between the elongated metal containing members; and, wherein the metal containing structure is embedded in a bulk of the metal hydride material such that the metal hydride material contacts and surrounds the elongated metal containing members.

Another exemplary embodiment includes a method of forming an integrated hydrogen storage structure including the steps of forming a plurality of continuously connected thermally conductive elongated members, the elongated members including continuously connected openings between the elongated members; and, forming a metal hydride material to contact the elongated members within the connected spaces and surround the elongated members.

Other illustrative embodiments of the invention will become apparent from the detailed description provided hereinafter. It should be understood that the detailed description and specific examples, while disclosing select embodiments of the invention, are intended for purposes of illustration only and are not intended to limit the scope of the invention.

BRIEF DESCRIPTION OF THE DRAWINGS

Illustrative embodiments of the invention will become more fully understood from the detailed description and the accompanying drawings, wherein.

DETAILED DESCRIPTION OF ILLUSTRATIVE EMBODIMENTS

Figure 1:
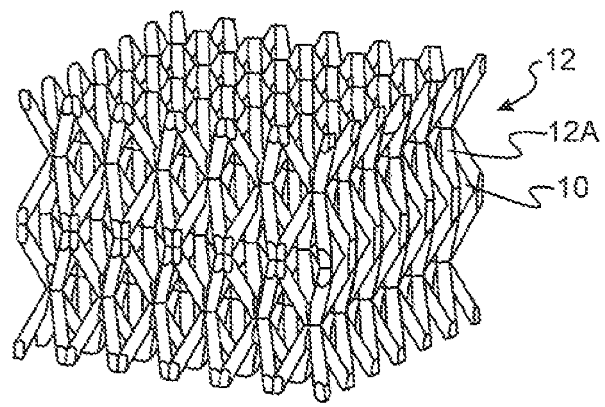
FIG. 1 is a 3-D schematic illustration of a metal structure according to one illustrative embodiment of the invention.

The following description of the embodiment(s) is merely illustrative in nature and is in no way intended to limit the invention, its application, or uses.

In some embodiments, a metal structure such as a continuously connected relatively high thermal conductivity structure having continuously connected openings, referred to herein as a matrix structure may be used to enhance thermal conductivity of metal hydrides for hydrogen storage applications. In some embodiments bulk metal hydride material is disposed into and around the matrix structure which is thereby embedded within the bulk metal hydride material. In some embodiments, the matrix is formed of substantially uniform and interconnected elongated members e.g., rods. By substantially uniform members is meant that the elongated members are substantially uniform in width or diameter. By substantially uniform is further meant a value, e.g., width or diameter that is within about 10% of an average value.

In some embodiments, the matrix structure includes a metal. In some embodiments, the metal containing matrix structure may have a relatively higher thermal conductivity than the metal hydrides, such as including a relatively high thermal conductivity metal or alloy, such as including but not limited to, metals or alloys including at least one of Al, Cu, Mg, and Ni.

The integrated matrix structure and bulk metal hydride material may be dimensioned and arranged such that a substantially uniform thermal conductivity per unit volume (e.g. bed thermal conductivity) of a volume of the integrated matrix/metal hydride may be achieved. In some embodiments, the matrix structure may be formed such that openings forming continuous channels may be formed between the elongated metal members of the interconnected matrix. In some embodiments, the openings or channels may be substantially uniformly sized in dimension e.g., a width between adjacent metal members defining the channel size.

One illustrative embodiment of the invention includes a product having a metal microstructure that has an open-cellular framework defined at least in part by a plurality of metal segments that form repetitive and integrated unit cells such that the metal microstructure has on open volume in the range of about 70 percent to about 95 percent. A metal hydride may be embedded into the open volume of the metal microstructure. The carbon microstructure may be more thermally conductive than the metal hydride material.

Another illustrative embodiment of the invention includes a product having a metal microstructure that has an open-cellular framework defined at least in part by a plurality of metal segments that interpenetrate at spaced apart and aligned nodes to form a three-dimensional microtruss having repetitive and integrated unit cells. The unit cells of the three-dimensional microtruss may include four metal segments that interpenetrate at one of the nodes to form opposed quadrilateral pyramidal halves. The plurality of metal segments may have a thickness and the nodes may be spaced apart from each other in a plane of the microtruss by a distance to provide the metal microstructure with an open volume ranging from about 70% to about 95%. At least one of the plurality of metal segments may also include internal cracks. Moreover, a metal hydride may be embedded into the open volume of the metal microstructure.

Yet another illustrative embodiment of the invention includes a method that includes the acts of providing a metal microstructure comprising an open-cellular framework defined at least in part by a plurality of metal segments that form repetitive and integrated unit cells such that the metal microstructure has an open volume in the range of about 70 percent to about 95 percent, and embedding a metal hydride material into the open volume of the carbon microstructure.

FIG. 1 is a 3-D illustration of a portion of one embodiment including a metal structure. In some embodiments, the metal matrix structure may be micro-sized. By micro-sized it is meant that a dimension, such as a width of the open spaces e.g., 10 between the elongated portions 12A of the matrix structure 12 and/or the width or diameter dimensions of the elongated portions of the matrix, may be on the order of microns in size e.g., 1-1000 microns. As shown in FIG. 1, in some embodiments, the matrix structure may resemble a continuously connected truss-like structure including a continuously connected opening substructure between elongated metal members of the truss 12, where the elongated metal members 12A, may be continuously physically connected with one another.

In some embodiments, the amount of open space volume within the matrix structure, e.g., forming the interconnected openings or channels, e.g., 10, may be up to about 98%. For example, in the metal structure shown in FIG. 1, the amount of open space volume is about 90%. In other embodiments, the matrix structures may include from about 70% to 98% open space volume including continuously connected void (opening) spaces (channels) having a diameter or width of about 10 μm to 1000 μm, including from about 100 μm to 1000 μm, where the elongated members, which form the metal network, may be substantially solid and may include a porosity, e.g. at the exterior surface of about 0-20%.

In some embodiments, the diameter of the metal rods, e.g. 12A, in the matrix structures is between about 0.1 μm to about 100 μm, including from about 0.1 μm to about 10 μm. As noted above, the open spaces may be from about 100 μm to about 1000 μm in width and defined by spacing between the elongated metal members to at least in part determine the open space volume of the matrix structures. It will be appreciated that the width dimensions of the metal rods and/or the total open space volume of the matrix structure may be selectively adjusted to achieve the most suitable thermal conductivity for a desired use, such a relatively high thermal conductivity with a relatively low energy density loss.

Figure 2A:
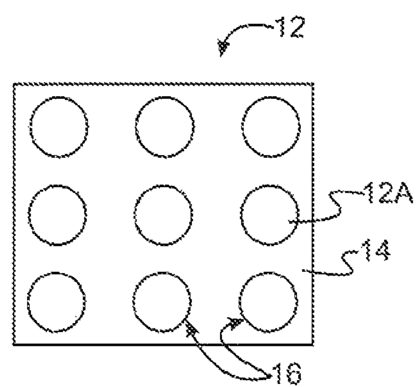
FIG. 2A is a top view schematic illustration of a block of integrated matrix/metal hydride structure according to one illustrative embodiment of the invention.

Referring to FIG. 2A, is shown a top view of an illustrative block of integrated matrix/metal hydride structure (e.g., metal-metal hydride), where the matrix network 12, formed of e.g., metal rods 12A, is substantially uniformly distributed within the bulk 14 of the metal hydride material. Thus, the matrix network may enhance heat transfer through the bulk of the metal hydrides. The spacing e.g., 16, between the metal rods 12A may be selected to adjust the thermal conductivity and/or the maximize the hydrogen capacity of the matrix/metal hydride bed, such as providing a spacing between the metal rods of between about 1 and about 1000 μm.

Figure 2B:
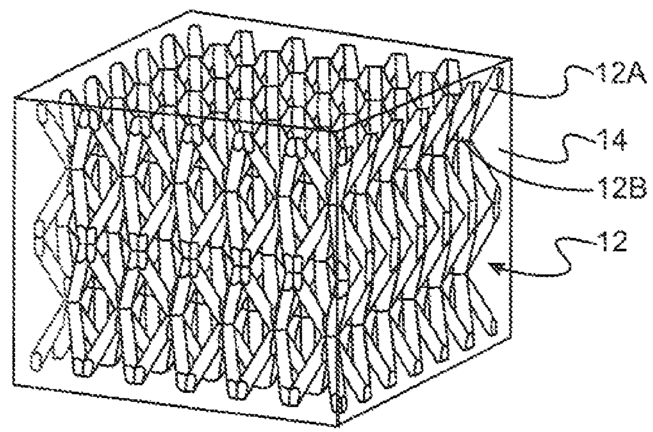
FIG. 2B is a 3-D schematic illustration of a metal structure embedded in a metal hydride material according to one illustrative embodiment of the invention.

Referring to FIG. 2B, is shown a 3-D illustrative view of the matrix 12 surrounded by, or embedded in, the metal hydride bulk 14, e.g., to form a bed of metal hydride (or metal hydride precursor) with the matrix structure embedded therein. Thus, in some embodiments, the matrix structure 12 is integral with and substantially filled with and surrounded with the metal hydride 14 material.

In some embodiments, the matrix structure integrated 12 into the metal hydride material 14 may include metal, coated metal, metal alloy, or coated metal alloy. In other embodiments, the precursors of the metal hydride material may be metal alloy, metals, or metal hydrides prior to the integration. In some embodiments, if the metal hydride precursors are metals or metal alloys, a hydrogenation process may be necessary to produce the metal hydride in the final integrated matrix/metal hydride structure.

In some embodiments, the matrix structure may include additional metals or compounds e.g. 12B, on an exterior surface portion of e.g., rods 12A, that may further increase their bed thermal conductivity and/or interaction between the matrix structures and the metal hydrides, such as, but not limited to other metals or alloys, and ceramic wetting agents. In some embodiments, metal dopants or wetting agents may form localized clusters or a thin layer on the surface of the matrix structure. In some embodiments, the amount of the metal dopants or ceramic wetting agents may be lower than about 0.1 wt % to about 5 wt % (weight percent) of the matrix structure or the integrated matrix/metal hydride structure.

In some embodiments, discussed above, modifying surface properties of the metal matrix structure by depositing additional materials such as metal or alloy compounds may advantageously increase interaction between metal hydrides and the matrix structure materials so as to maximize the bed thermal conductivity of the integrated matrix/metal hydride structure. Precursors and preparation conditions of the matrix structure may be controlled to obtain the most suitable thermal conductivity and porosity. Porosity, thickness, and surface morphology of the matrix structure materials may be controlled by varying precursors for the matrix pretreatment conditions.

Figure 3:
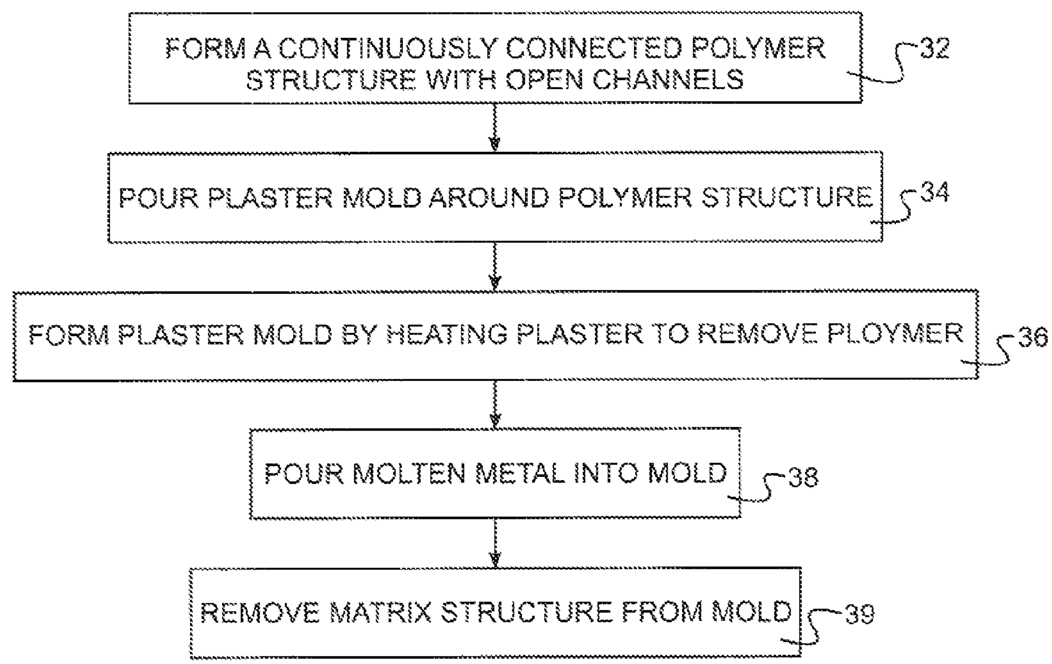
FIG. 3 is an illustration of acts in a method of forming a metal structure according to one illustrative embodiment of the invention.

In some embodiments, the metal structures may be fabricated through a plastic mold process using a polymer structure. Referring to FIG. 3, in an exemplary method embodiment, in act 32 a polymer material forming a continuously connected structure with continuously connected openings (channels) is formed. In act 34, a plaster may be poured surrounding polymer structure. In act 36 the plaster structure may be heated to remove the polymer structure material to form a plaster mold having a structure substantially the same as the polymer structure. In act 38, a molten metal, e.g. Al, Mg, etc., may be poured into the plaster mold to form a metal matrix structure. In some embodiments, such as gravity casting, the plaster mold may be evacuated to allow the molten metal to flow through narrow routes in the porous plaster mold. In act 39, following casting the molten metal, the matrix structure may be removed, e.g., spray water may onto the plaster mold to reveal the metal matrix structure.

In some embodiments, various polymer precursors may be used for making the polymer structures and the calcination (heating) temperature, atmosphere, pressure, and other conditions necessary for making the matrix structures may be varied in order to adjust the thickness or diameter of the cast rods, and the total open volume of the cast matrix structure (e.g., micro-sized).

Figure 4A:
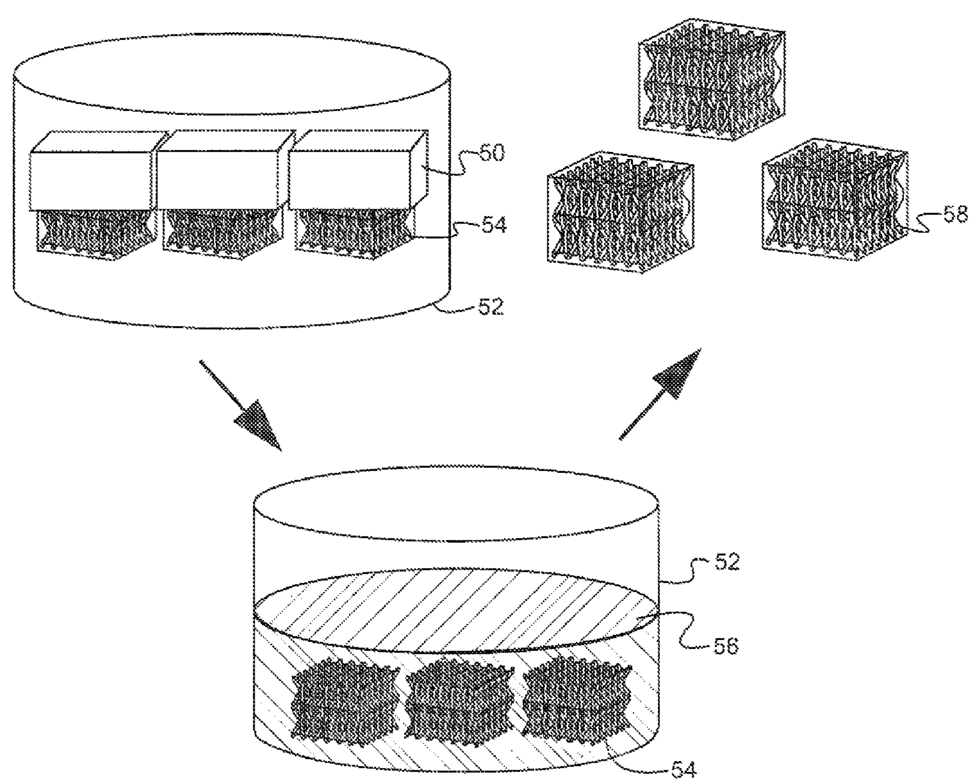
FIG. 4A is an illustration of acts in a method of forming a metal structure embedded in a metal hydride material according to one illustrative embodiment of the invention.
Figure 4B:
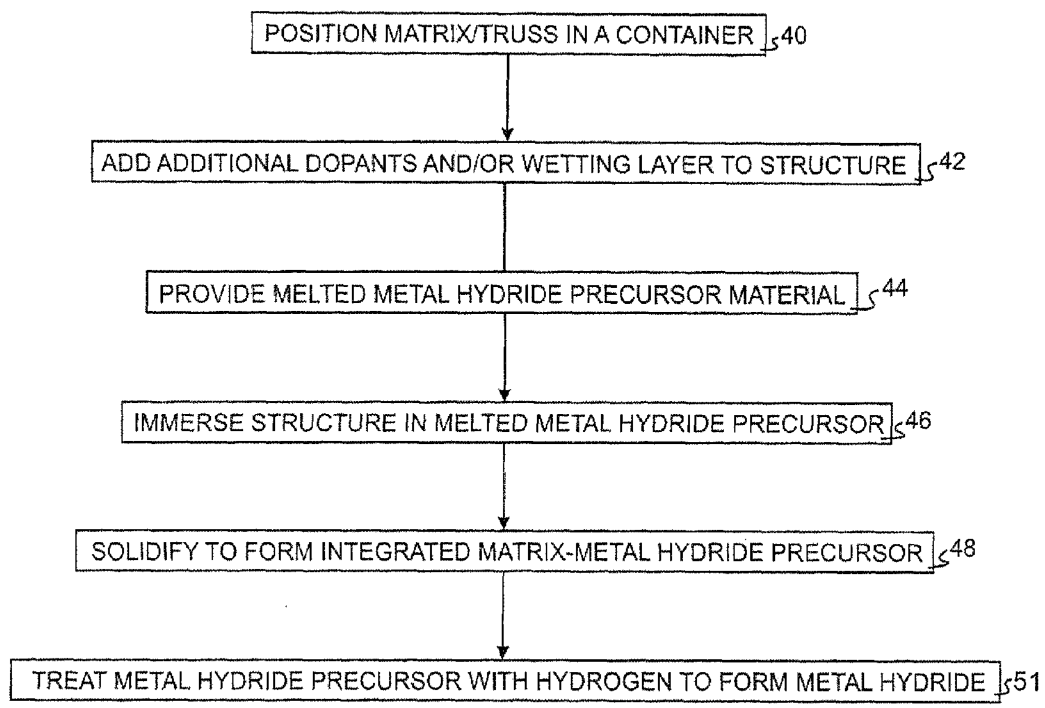
FIG. 4B is an illustration of acts in a method to form an integrated matrix/metal hydride structure according to one illustrative embodiment of the invention.

Referring to FIGS. 4A and 4B is shown an exemplary method for forming an integrated matrix/metal hydride structure. Referring to FIGS. 4A and 4B, in act 40 and as shown in FIG. 4A a matrix structure material 54 may be situated in the bottom of a container 52 (e.g., high temperature boat). In optional act 42, additional dopants or a wetting layer may be applied to the matrix structure to increase the uptake of molten metal hydride precursors onto the matrix structure 54. In act 44 metal hydride precursors 50 are provided as a melted solution 56 in container 52, and where the metal hydride precursors 50 may optionally be placed on top of the matrix material 54 and melted in place in the container 52. In act 46, following or concurrently with melting the metal hydride precursor to form a solution 56, the matrix structure 54 may be immersed into the melted metal hydride precursor solution 56. In step 48, the solution 56 with the embedded matrix 54 is solidified to form a solidified integrated structure 58 and optionally resized. In act 51, the precursor metal hydride material in the solidified structure 58 is made into a metal hydride by treating with hydrogen.

Referring to FIG. 4A, in some embodiments, the high temperature boat 52 may fit the size and shape of the precursor matrix structure(s) 54, thereby the minimizing waste of metal hydride precursor solution 56. For example, the metal hydride precursor material(s) 50 may be positioned on top of the matrix structure(s) 54 within the boat prior to the melting process. After melting and then cooling to room temperature, the solidified block 58 that including metal hydride material that has surrounded and filled the matrix structure 54 during melting can be cut or formed into smaller pieces to achieve fresh surfaces.

In some embodiments, the precursors of the metal hydrides may include at least one of metal, metal alloys, and primary metal hydrides, which may be selected to have melting points below the temperature that can damage the matrix structure when a melting process is employed to integrate the matrix structure and metal hydride together. In other embodiments, the metal hydrides may be formed from hydrogenation of their metal precursors that have been previously integrated with the matrix structure.

In some embodiments, it will be appreciated that other processes such as a cold-press process may be employed to produce the integrated matrix/metal hydride structure where the interface thermal conductivity between the embedded metal structure and metal hydrides is satisfactory. For example, the matrix material and metal hydride precursor in powder form may be cold or hot pressed in a die to make an integrated matrix/metal hydride structure.

Example

TiCrMn and Al micro-sized matrix structures were selected for one illustrative embodiment. A cold press process was employed to integrate the TiCrMn pellets into the Al matrix structure. TiCrMn pellets were prepared with and without the Al matrix structure. Pellets were prepared in the following formats: TiCrMn only, TiCrMn with polymer binder, TiCrMn with Al micro-sized matrix structure, TiCrMn with Al micro-sized matrix structure and polymer binder. In forming the integrated structure, TiCrMn was gradually added until the Al matrix structure was covered (e.g., die gently tapped throughout addition of metal hydride). The pellets with additional polymer binder, EPDM (ethylene-propylene-diene terpolymer), were prepared in the same manner. Prior to preparing binder-metal hydride pellets, the binder was cryo-milled for 40 minutes to obtain fine shavings from bulk material. EPDM was then planetary milled with TiCrMn for 20 minutes at 400 RPM resulting in a fine powder with 5 wt % binder. All pellets were pressed for 10 minutes at 10,000 psi and room temperature except for pellets containing binder, of which were pressed at 200° C. for 5 minutes. Pelletization was performed with a 12.7 mm die and Carver Model C, 11 metric ton laboratory countertop press. Heating of pellet die was achieved with a band heater and Omega solid-state temperature control unit. Samples were tested for thermal conductivity at various temperatures, respectively. Table 1 shows the results.

TABLE 1

Thermal Conductivity Test Results.

| | Temp. (C.) | wt % binder | Thermal Conductivity (W/K/m) |
|---|---|---|---|
| STD (TiCrMn) | 25 | 0 | 1.634 |
| STD (TiCrMn) | 50 | 0 | 1.621 |
| STD (TiCrMn) | 75 | 0 | 1.584 |
| TiCrMn + Binder | 25 | 5% | 3.048 |
| TiCrMn + Binder | 50 | 5% | 3.049 |
| TiCrMn + Truss | 25 | 0 | 9.051 |
| TiCrMn + Truss + Binder | 25 | 5 | 8.993 |

The standard (STD) TiCrMn sample showed about the same bed thermal conductivity (~1.6 W/K/m) at different temperatures from 25° C. to 75° C. Adding binder material into the TiCrMn sample resulted in an increase with the bed thermal conductivity from 1.6 to 3.0 W/K/m. The improved thermal conductivity with added binder material may indicate poor physical or thermal conductivity interaction among TiCrMn the pellets. Increasing temperature did not affect on the bed thermal conductivity of the TiCrMn with binder material. In contrast, the bed thermal conductivity was significantly improved when combining the TiCrMn and Al micro-sized matrix structural material. The bed thermal conductivity of the TiCrMn with the micro-sized matrix structure is almost 5.6 times of original standard TiCrMn. The binder material did not help increase the thermal conductivity of the TiCrMn with the Al micro-sized structural material. The above results indicate that the Al micro-sized matrix structure improved the bed thermal conductivity.

The following is a description of select illustrative embodiments within the scope of the invention. The invention is not, however, limited to this description; and each embodiment and components, elements, acts and/or steps within each embodiment may be used alone or in combination with any of the other embodiments and components, elements, acts or steps within the other embodiments.

Embodiment 1 may include an integrated hydrogen storage structure comprising: a plurality of continuously connected thermally conductive elongated members, said elongated members comprising continuously connected openings between said elongated members; and, a metal hydride material contacting said elongated members and disposed within said connected openings and surrounding said elongated members.

Embodiment 2 may include the integrated structure of embodiment 1, wherein said elongated members comprise a metal at least on a surface portion thereof.

Embodiment 3 may include the integrated structure of any one of embodiments 1-2, wherein said elongated members comprise at least one of Al, Cu, Mg, and Ni.

Embodiment 4 may include the integrated structure of any one of embodiments 1-3, wherein a width of said elongated metal members is substantially uniform.

Embodiment 5 may include the integrated structure of any one of embodiments 1-4 wherein said width is from about 0.1 micron to about 100 microns.

Embodiment 6 may include the integrated structure of any one of embodiments 1-5, wherein said integrated structure has an open space volume comprising said continuously connected openings of between about 70% and about 98% of a total volume of said integrated structure.

Embodiment 7 may include the integrated structure of any one of embodiments 1-6, wherein a spacing between said elongated members is from 10 microns to about 1000 microns.

Embodiment 8 may include the integrated structure of any one of embodiments 1-7, wherein said elongated members comprise an exterior surface additive comprising at least one of an additional thermally conductive material or alloy and a wetting agent, disposed on an exterior surface of said elongated members.

Embodiment 9 may include the integrated structure of any one of embodiments 1-8, wherein said exterior surface additive is between about 0.1 to about 5 wt % of said integrated structure.

Embodiment 10 may include the integrated structure of any one of embodiments 1-9, wherein said elongated members are substantially solid metal.

Embodiment 11 may include an integrated metal hydride hydrogen storage bed comprising: a metal containing structure comprising plurality of continuously connected elongated metal containing members, said elongated metal containing members comprising continuously connected spaces between said elongated metal containing members; and, wherein said metal containing structure is embedded in a bulk of said metal hydride material such that said metal hydride material contacts and surrounds said elongated metal containing members.

Embodiment 12 may include a method of forming an integrated hydrogen storage structure comprising: forming a plurality of continuously connected thermally conductive elongated members, said elongated members comprising continuously connected openings between said elongated members; and, forming a metal hydride material to contact said elongated members within said connected spaces and surround said elongated members.

Embodiment 13 may include a method as set forth in embodiment 12, wherein said elongated members comprise a metal at least on a surface portion thereof.

Embodiment 14 may include a method as set forth in any of embodiments 12-13, wherein said elongated members comprise at least one of Al, Cu, Mg, and Ni.

Embodiment 15 may include a method as set forth in any of embodiments 12-14, wherein a width of said elongated metal members is substantially uniform.

Embodiment 15 may include a method as set forth in any of embodiments 12-14, wherein said width is from about 0.1 micron to about 100 microns.

Embodiment 16 may include a method as set forth in any of embodiments 12-15, wherein said integrated structure has an open space volume comprising said continuously connected openings of between about 70% and about 98% of a total volume of said integrated structure.

Embodiment 17 may include a method as set forth in any of embodiments 12-16, wherein a spacing between said elongated members is from 10 microns to about 1000 microns.

Embodiment 18 may include a method as set forth in any of embodiments 12-17, wherein said elongated members comprise an exterior surface additive comprising at least one of an additional thermally conductive material or alloy and a wetting agent, disposed on an exterior surface of said elongated members.

Embodiment 19 may include a method as set forth in any of embodiments 12-18, wherein said exterior surface additive is between about 0.1 to about 5 wt % of said integrated structure.

Embodiment 20 may include a method as set forth in any of embodiments 12-19, wherein said elongated members include solid metal rods.

Embodiment 21 may include a method as set forth in any of embodiments 12-20, wherein said forming a plurality of continuously connected thermally conductive elongated members further comprises: forming a mold for forming said elongated members; pouring a melted material into said mold and solidifying said material to form said elongated members; and, removing said elongated members from said mold.

Embodiment 22 may include a method as set forth in any of embodiments 12-21, wherein said forming a metal hydride material further comprises: providing a molten metal hydride precursor material; immersing said elongated members in said molten metal hydride precursor material; and, solidifying said metal hydride precursor material to surround said elongated members.

Embodiment 23 may include a method as set forth in any of embodiments 12-22, wherein said forming a metal hydride material further comprises: providing a powder metal hydride precursor material to surround said elongated members; and, pressing said metal hydride precursor material surrounding said elongated members in a die.

The above description of embodiments of the invention is merely exemplary in nature and, thus, variations thereof are not to be regarded as a departure from the spirit and scope of the invention.

What is claimed is:

1. An integrated hydrogen storage structure comprising:

a plurality of continuously connected thermally conductive elongated members comprising solid metal rods, said elongated members comprising continuously connected openings between said elongated members;

a metal hydride material contacting said elongated members and disposed within said connected openings and surrounding said elongated members; and wherein said elongated members comprise an exterior surface additive comprising a wetting agent and at least one of an additional thermally conductive material or alloy disposed on an exterior surface of said elongated members.

2. The integrated structure of claim 1, wherein said elongated members comprise a metal at least on a surface portion thereof.

3. The integrated structure of claim 1, wherein said elongated members comprise at least one of Al, Cu, Mg, and Ni.

4. The integrated structure of claim 1, wherein a width of said elongated metal members is substantially uniform.

5. The integrated structure of claim 4, wherein said width is from about 0.1 micron to about 100 microns.

6. The integrated structure of claim 1, wherein said integrated structure has an open space volume comprising said continuously connected openings of between about 70% and about 98% of a total volume of said integrated structure.

7. The integrated structure of claim 1, wherein a spacing between said elongated members is from 10 microns to about 1000 microns.

8. The integrated structure of claim 1, wherein said exterior surface additive is between about 0.1 to about 5 wt % of said integrated structure.

9. An integrated metal hydride hydrogen storage bed comprising:

a metal containing structure comprising plurality of continuously connected elongated metal containing members comprising solid metal rods, said elongated metal containing members comprising continuously connected spaces between said elongated metal containing members; and, wherein said metal containing structure is embedded in a bulk of said metal hydride material such that said metal hydride material contacts and surrounds said elongated metal containing members; and wherein said elongated members comprise an exterior surface additive comprising a wetting agent and at least one of an additional thermally conductive material or alloy-disposed on an exterior surface of said elongated members.

10. A method of forming an integrated hydrogen storage structure comprising:

forming a plurality of continuously connected thermally conductive elongated members, said elongated members comprising continuously connected openings between said elongated members;

forming a metal hydride material to contact said elongated members within said connected spaces and surround said elongated members; and wherein said forming a plurality of continuously connected thermally conductive elongated members further comprises:

forming a mold for forming said elongated members;

pouring a melted material into said mold and solidifying said material to form said elongated members; and, removing said elongated members from said mold.

11. The method of claim 10, wherein said elongated members comprise a metal at least on a surface portion thereof.

12. The method of claim 10, wherein said elongated members comprise at least one of Al, Cu, Mg, and Ni.

13. The method of claim 10, wherein a width of said elongated metal members is substantially uniform.

14. The method of claim 13, wherein said width is from about 0.1 micron to about 100 microns.

15. The method of claim 10, wherein said integrated structure has an open space volume comprising said continuously connected openings of between about 70% and about 98% of a total volume of said integrated structure.

16. The method of claim 15, wherein a spacing between said elongated members is from 10 microns to about 1000 microns.

17. The method of claim 10, wherein the elongated members comprise an exterior surface additive between about 0.1 to about 5 wt % of said integrated structure.

18. The method of claim 17, wherein said elongated members are substantially solid metal rods.

19. The method of claim 10, wherein said forming a metal hydride material further comprises:

providing a molten metal hydride precursor material;

immersing said elongated members in said molten metal hydride precursor material; and, solidifying said metal hydride precursor material to surround said elongated members.

20. The method of claim 10, wherein said forming a metal hydride material further comprises:

providing a powder metal hydride precursor material to surround said elongated members; and, pressing said metal hydride precursor material surrounding said elongated members in a die.

* * * * *